(12) United States Patent
Shiu et al.

(10) Patent No.: US 11,145,925 B2
(45) Date of Patent: Oct. 12, 2021

(54) CYLINDRICAL BATTERY CELL WITH OVERMOLDED GLASS FEEDTHROUGH

(71) Applicant: Apple Inc., Cupertino, CA (US)

(72) Inventors: Brian K. Shiu, Sunnyvale, CA (US); Christopher R. Pasma, Redwood City, CA (US); Gerald K. Cheung, Sunnyvale, CA (US); Haran Balaram, Sunnyvale, CA (US); Junhua Liu, Hayward, CA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 16/211,433

(22) Filed: Dec. 6, 2018

(65) Prior Publication Data
US 2020/0083498 A1 Mar. 12, 2020

Related U.S. Application Data

(60) Provisional application No. 62/727,778, filed on Sep. 6, 2018.

(51) Int. Cl.
*H01M 50/186* (2021.01)
*H01M 10/04* (2006.01)
*H01M 50/191* (2021.01)
*H01M 50/107* (2021.01)
*H01M 50/543* (2021.01)

(52) U.S. Cl.
CPC ..... *H01M 50/186* (2021.01); *H01M 10/0431* (2013.01); *H01M 50/107* (2021.01); *H01M 50/191* (2021.01); *H01M 50/543* (2021.01)

(58) Field of Classification Search
None
See application file for complete search history.

(56) References Cited

U.S. PATENT DOCUMENTS

| | | | |
|---|---|---|---|
| 4,350,747 A | 9/1982 | Alberto | |
| 4,358,514 A | 11/1982 | Garoutte et al. | |
| 4,559,283 A | 12/1985 | Kruger et al. | |
| 5,004,656 A | 4/1991 | Sato et al. | |
| 8,043,738 B2 | 10/2011 | Suzuki et al. | |
| 9,118,087 B2 | 8/2015 | Abe et al. | |
| 9,616,518 B2 | 4/2017 | Kroll et al. | |
| 2003/0017390 A1 | 1/2003 | Probst et al. | |
| 2003/0096162 A1 | 5/2003 | Lasater et al. | |
| 2007/0090788 A1 | 4/2007 | Hansford et al. | |

(Continued)

FOREIGN PATENT DOCUMENTS

| | | |
|---|---|---|
| CA | 2755597 | 1/2015 |
| CN | 101533899 A | 9/2009 |

(Continued)

*Primary Examiner* — Sarah A. Slifka
(74) *Attorney, Agent, or Firm* — BakerHostetler

(57) ABSTRACT

The disclosed technology relates to an electrical feedthrough for a cylindrical battery cell. The electrical feedthrough may include an annular channel having an outer sidewall, an inner sidewall, and a base; an insulator formed of glass having an overmold portion; and a pin extending through the insulator and configured to form an external battery terminal. The insulator is bonded to the inner sidewall of the annular channel and a portion of the base of the annular channel. The overmold portion prevents electrical contact between a set of electrodes and the electrode feedthrough.

20 Claims, 5 Drawing Sheets

(56) References Cited

U.S. PATENT DOCUMENTS

| | | |
|---|---|---|
| 2007/0122697 A1 | 5/2007 | Wutz et al. |
| 2012/0160558 A1 | 6/2012 | Okamoto et al. |
| 2012/0202107 A1 | 8/2012 | Ito |
| 2015/0140417 A1 | 5/2015 | Matsumoto et al. |
| 2016/0315306 A1 | 10/2016 | Jang et al. |
| 2017/0092907 A1 | 3/2017 | Hyung et al. |
| 2017/0162838 A1 | 6/2017 | Revirand et al. |
| 2018/0026256 A1 | 1/2018 | Inoue et al. |
| 2018/0083312 A1 | 3/2018 | Shiu et al. |
| 2019/0341587 A1 | 11/2019 | Pasma et al. |
| 2020/0083498 A1 | 3/2020 | Shiu et al. |
| 2020/0176728 A1 | 6/2020 | Shiu et al. |
| 2020/0373548 A1 | 11/2020 | Kozuki |

FOREIGN PATENT DOCUMENTS

| | | | |
|---|---|---|---|
| CN | 102197515 A | | 9/2011 |
| CN | 102629672 A | | 8/2012 |
| CN | 104781946 A | | 7/2015 |
| CN | 105118954 A | | 12/2015 |
| EP | 1620907 | * | 2/2007 |
| JP | S61-224263 | | 10/1986 |
| JP | 2008-192552 A | | 8/2008 |
| WO | WO 2004/086538 | | 10/2004 |

* cited by examiner

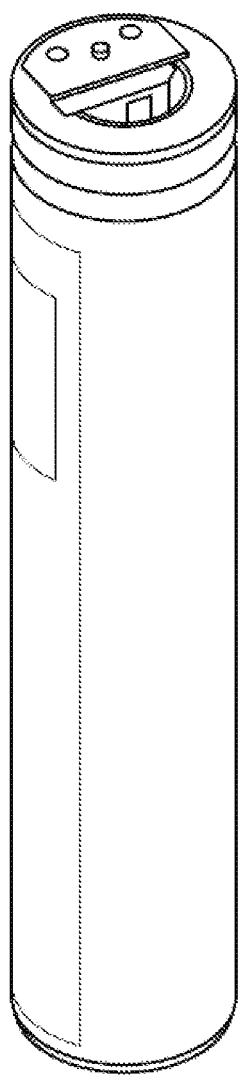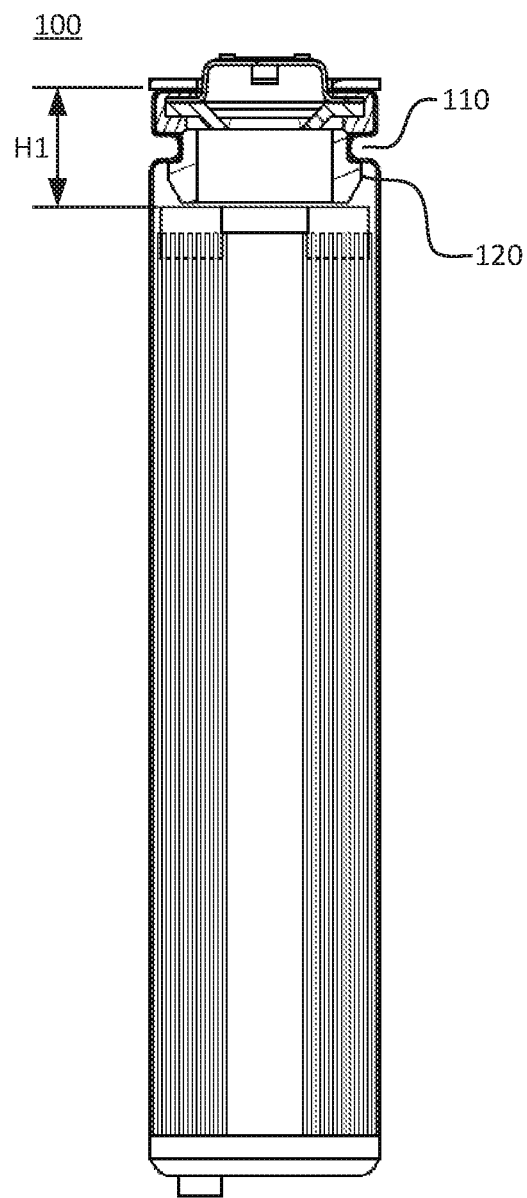
FIG. 1A
Prior Art
FIG. 1B
Prior Art

CYLINDRICAL BATTERY CELL WITH OVERMOLDED GLASS FEEDTHROUGH

PRIORITY

This application claims the benefit under 35 U.S.C. § 119(e) of U.S. Provisional Patent Application Ser. No. 62/727,778, entitled "CYLINDRICAL BATTERY CELL WITH OVERMOLDED GLASS FEEDTHROUGH," filed on Sep. 6, 2018, which is incorporated herein by reference in its entirety.

TECHNICAL FIELD

The present disclosure relates generally to cylindrical battery cells, and more particularly, to a cylindrical battery cell with an overmolded glass feedthrough.

BACKGROUND

Battery cells are used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of alternating layers of anode and cathode electrodes, with a separator disposed there-between. The layers may be packaged in an cylindrical enclosure. Anode electrodes of the cell may be electrically coupled to a wall of the enclosure where the enclosure is itself, made of a conductive material. The cathode electrodes, however, may require an electrical feedthrough to enable an electrical connection, through the enclosure, to the cathode electrodes. In addition, electrical feedthroughs must insulate the electrical connection to the cathode electrodes from the enclosure to prevent shorting of the battery cell. The enclosure enclosing the electrodes may be filled with electrolyte thereby requiring the electrical feedthrough to also provide a hermetically seal to prevent unwanted leakage or failure.

Conventional feedthroughs for cylindrical battery cells may utilize a crimping operation to attach the feedthrough to the enclosure. Such crimping operations, however, may require additional space on the enclosure to accommodate the crimp and to ensure a proper seal, thereby reducing packaging efficiency.

SUMMARY

The disclosed embodiments provide for a battery cell that utilizes an overmolded glass feedthrough to prevent electrical contact or shorting of electrodes to the feedthrough. The battery cell includes a wound set of layers that include a cathode layer, an anode layer, and a separator layer disposed between the cathode layer and the anode layer. The set of layers are enclosed within a cylindrical enclosure having an opening for receiving a feedthrough. The feedthrough includes an annular channel having an outer sidewall, an inner sidewall, and a base; an insulator formed of glass; and a pin extending through the insulator. The insulator is bonded to the inner sidewall of the annular channel and a portion of the base of the annular channel. The insulator also includes an overmold portion that extends between the base of the annular channel and the set of layers. The overmold portion is configured to prevent electrical contact between the set of layers and the annular channel. The pin is electrically coupled to the set of layers to form an external battery terminal.

In some embodiments, a battery feedthrough includes an annular channel, an insulator, and a pin. The annular channel may include an outer sidewall, an inner sidewall, and a base. The insulator may be formed of glass, and bonded to the inner sidewall of the annular channel and a portion of the base of the annular channel. The insulator further includes an overmold portion that extends from the base of the annular channel. The pin is configured to form an external battery terminal.

In some embodiments, a method for manufacturing a battery cell is disclosed. The method includes inserting a set of layers within a cylindrical enclosure through an opening. The set of layers include a cathode layer, an anode layer, and a separator layer disposed between the cathode layer and the anode layer. The method also includes welding a tab extending from the set of layers to a pin, the pin electrically coupled to the set of layers to form an external battery terminal. The method further includes folding the tab within the cylindrical enclosure and disposing a feedthrough within the opening of the cylindrical enclosure. The feedthrough includes an annular channel having an outer sidewall, an inner sidewall, and a base. The feedthrough also includes an insulator formed of glass that is bonded to the inner sidewall of the annular channel and a portion of the base of the annular channel. The insulator includes an overmold portion that extends from the base of the annular channel. The overmold portion is configured to prevent electrical contact between the set of layers and the annular channel. The feedthrough also includes the pin extending through the insulator.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 1A illustrates a perspective view of a conventional cylindrical battery cell;

FIG. 1B illustrates a cross-section view of a conventional cylindrical battery cell;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Rechargeable batteries for portable electronic devices often include cells that are made of alternating layers of anode and cathode electrodes, with a separator disposed there-between. The layers may be packaged in an enclosure and may utilize an electrical feedthrough to make an electrical connection to cathode electrodes through the enclosure. The enclosure enclosing the electrodes may be filled with electrolyte thereby requiring the feedthrough to hermetically seal the enclosure to prevent unwanted leakage or failure. In addition, electrical feedthroughs must insulate the electrical connection from the enclosure to prevent shorting of the battery cell.

Conventional feedthroughs for cylindrical battery cells may utilize a crimping operation to attach the feedthrough to the enclosure. Such crimping operations, however, require additional space on the enclosure to accommodate the crimp and to ensure a proper seal, thereby reducing packaging efficiency. Accordingly, there is a need for certain embodiments of a compact and robust feedthrough for use in small or thin cylindrical battery cells that improves packaging efficiency and increases energy capacity.

The disclosed technology addresses the foregoing limitations of conventional feedthroughs for cylindrical battery cells by utilizing a glass feedthrough that utilizes an overmold to insulate the feedthrough from the electrodes, thereby improving packaging efficiency and increasing energy capacity by eliminating the need for a crimping operation and associated components.

FIGS. 1A and 1B illustrate views of a conventional cylindrical battery cell 100. The conventional cylindrical battery cell 100 utilizes a crimping operation to create a crimp 110 at a feedthrough. The crimp 110 requires use of an insert 120 that creates a mechanical stop for the crimping operation, and when crimped, creates a seal between an enclosure of the battery cell 100 and the feedthrough. As shown in FIG. 1B, the insert 120 and other components associated with a successful crimping operation results in a distance H1 between a set of layers or jelly roll, and an end of the battery cell 100. Specifically, in order to adequately crimp sidewalls of the enclosure to the insert 120, there must be sufficient area surrounding the crimp 110 to allow a crimping operation to be performed.

Figure 2:
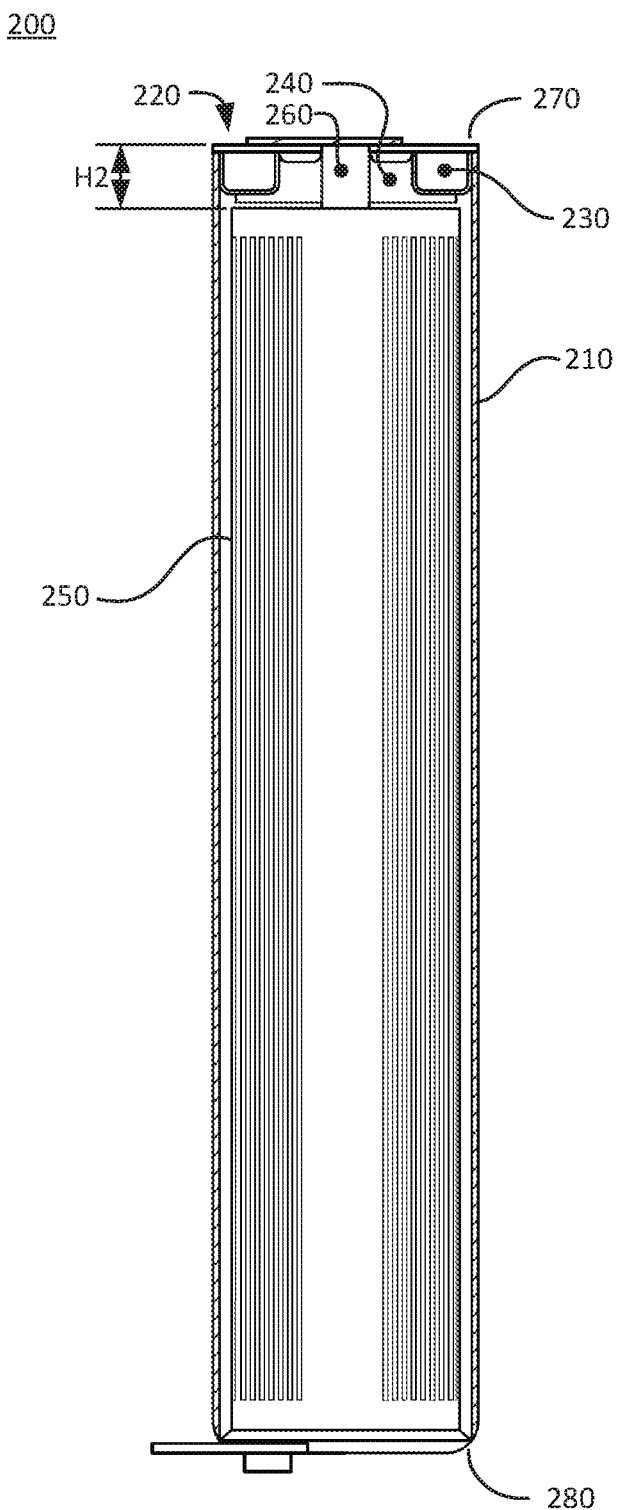
FIG. 2 illustrates a cross-section view of a cylindrical battery cell with an overmolded glass feedthrough, in accordance with various aspects of the subject technology.

FIG. 2 illustrates a cross-section view of a cylindrical battery cell 200 with an overmolded glass feedthrough, in accordance with various aspects of the subject technology. The battery cell 200 comprises a cylindrical enclosure 210 having a first opening 270, a wound set of layers 250 enclosed within the cylindrical enclosure 210, and a feedthrough 220. The enclosure 210 may be formed of a rigid material, such as a metal alloy which may, for example, include stainless steel, aluminum, aluminum alloy, or other sufficiently rigid materials as would be known by a person of ordinary skill in the art. The enclosure 210 may have a non-corrosive coating line the interior of the enclosure 210 and is configured to enclose and protect one or more sets of electrodes or layers disposed within the enclosure. The enclosure 210 may have a cylindrical, cuboid, prism, conical, or pyramid shape. In one aspect, the enclosure 210 may be drawn from tube stock to form a cylinder having the first opening 270 and a second opening 280. In other aspects, the enclosure 210 may have a closed end opposite the first opening 270. The first opening 270 and/or the second opening 280 may each be configured to receive the feedthrough 220.

The wound set of layers 250 may comprise at least one cathode layer with an active coating, a separator, and at least one anode layer with an active coating, as discussed below with reference to FIG. 4. A tab (as shown in FIG. 3) may extend from the anode and/or cathode layers, as discussed further below.

The feedthrough 220 may comprise an annular channel 230, an insulator 240, and a pin 260. The feedthrough 220 is configured to seal the set of layers 250 within the enclosure 210 and to provide an electrical connection to the anode or cathode layer of the set of layers 250 via the pin 260. The feedthrough 220 may be disposed within the first opening 270 and bonded, glued, welded, or coupled, to the enclosure 210. As shown in FIG. 2, the feedthrough 220 eliminates the need for a crimping operation by utilizing a bonding, gluing, welding, or coupling operation, and utilizes an overmolded insulator 240 to prevent inadvertent electrical contact between the annular channel 230 and the set of layers 250. As a result, a distance H2 between the set of layers 250 (e.g., jelly roll) and an end of the battery cell 200 is reduced when compared to the conventional battery cell 100 of FIG. 1B, thereby improving packaging efficiency and increasing energy capacity by eliminating the need for a crimping operation and associated components.

Figure 3:
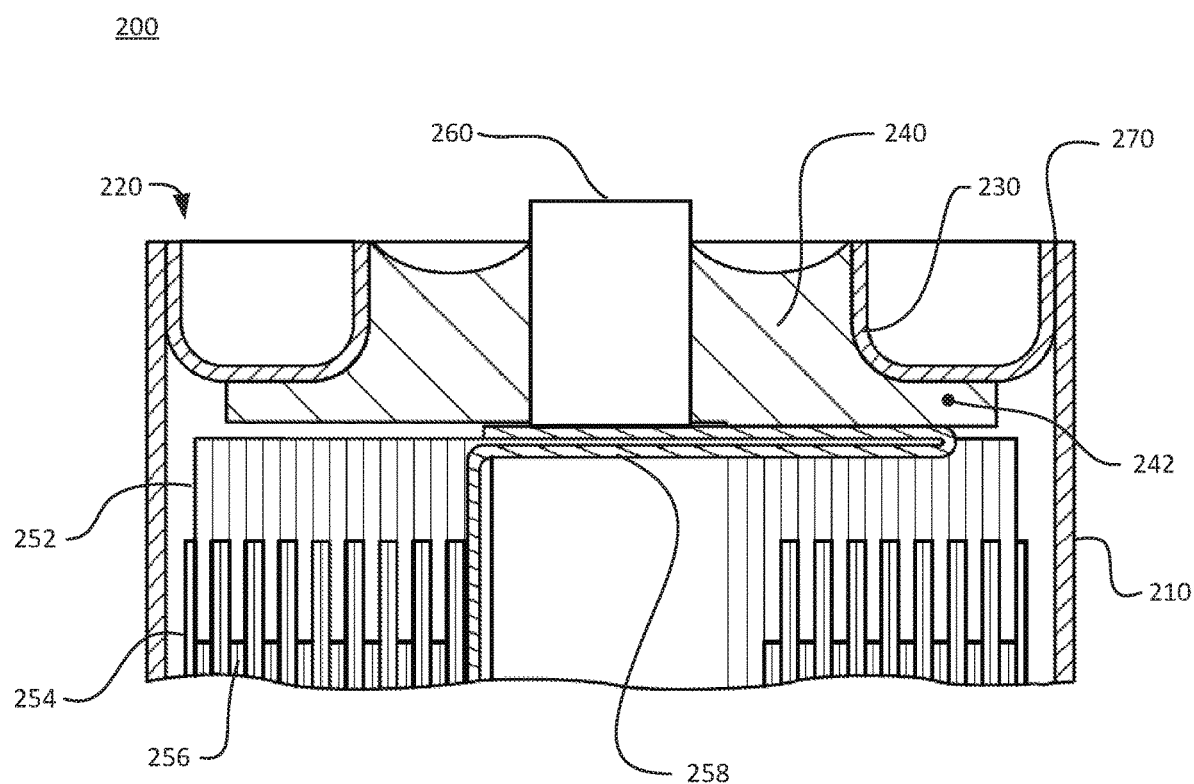
FIG. 3 illustrates a detailed cross-section view of a cylindrical battery cell with an overmolded glass feedthrough, in accordance with various aspects of the subject technology.

FIG. 3 illustrates a detailed cross-section view of the cylindrical battery cell 200 with the overmolded glass feedthrough 220, in accordance with various aspects of the subject technology. The annular channel 230 of the feedthrough 220 comprises an outer sidewall, an inner sidewall, and a base. The outer sidewall of the annular channel 230 contacts a corresponding sidewall of the enclosure 210, and after a bonding, gluing, welding, or coupling operation, creates a hermetic seal between the feedthrough 220 and the enclosure 210. For example, the annular channel 230 may be welded to the opening 270 of the enclosure 210 along a periphery by welding the outer sidewall of the annular channel 230 to the sidewall of the enclosure 210. The annular channel 230 may be made of a rigid material, and may further be made of a material that is adequate for welding to the enclosure 210. For example, if the enclosure 210 is formed of a stainless steel material, the annular channel 230 may also be formed of a stainless steel material to enable welding of the annular channel 230 and enclosure 210.

The insulator 240 is formed of an electrically insulating material, such as glass, and includes an overmold portion 242 to prevent electrical contact between the cathode 254 or anode 256 of the set of layers, and the annular channel 230. The insulator 240 may be bonded to the inner sidewall of the annular channel 230 and a portion of the base of the annular channel 230. The insulator 240 is also bonded to the pin 260 and surrounds the pin 260. The overmold portion 242 of the insulator 240 extends between the base of the annular channel 230 and the separator 252 of the set of layers. As discussed above, the overmold portion 242 prevents electrical contact between the set of layers and the annular channel 230.

The pin 260 extends through the insulator 240 and is electrically coupled to the cathode 254 or anode 256 of the set of layers to form an external battery terminal. The pin may comprise a metal or alloy, or material that is capable of conducting electricity, such as molybdenum. In one aspect, the pin 260 may be spot welded to a tab 258 extending from the cathode 254 or anode 256 of the set of layers. The tab 258 may extend from the opening 270 to facilitate a spot welding operation to the pin 260. When coupled to the tab 258 extending from the set of layers, electrical energy from the cathode 254 or anode 256, for example, passes through the tab 258 and to the pin 260, to thereby provide an external terminal for the battery cell 200. After welding, the tab 258 may be configured to be stowed or folded within the enclosure 210, proximal to the feedthrough 220, and more specifically, proximal to the annular channel 230. The overmold portion 242 of the insulator 240 is further configured to prevent electrical contact between the fold of the tab 258 and the annular channel 230. For example, by extending a diameter of the overmold portion 242 to extend radially beyond the fold of the tab 258, electrical contact between the fold of the tab 258 and the annular channel 230 is prevented.

In some aspects, the battery cell 200 may further comprise a second feedthrough disposed at the second opening 280 (as shown in FIG. 2). The second opening 280 may be disposed opposite the first opening 270. The second feedthrough may comprise the same components as the feedthrough 220, which may include a second annular channel (similar to annular channel 230), a second insulator (similar to insulator 240), and a second pin (similar to pin 260). The second feedthrough is configured to electrically couple the cathode 254 or anode 256 of the set of layers to form a second external battery terminal.

Figure 4:
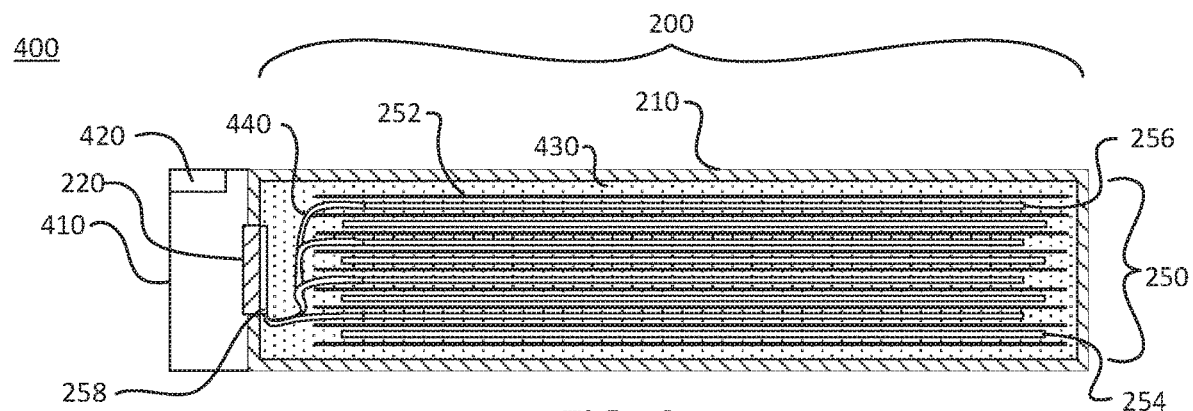
FIG. 4 illustrates a cross-section view of an assembled battery cell, in accordance with various aspects of the subject technology.

FIG. 4 illustrates a cross-section view of an assembled battery 400, in accordance with various aspects of the subject technology. The assembled battery 400 includes the battery cell 200, enclosure 210, feedthrough 220, a battery management unit 410, and battery terminals 420. The battery management unit 410 is configured to manage recharging of the battery cell 200. The terminals 420 are configured to engage with corresponding connectors on a portable electronic device to provide power to components of the portable electronic device.

The battery cell 200 includes a plurality of layers 250 comprising a cathode with an active coating 254, a separator 252, and an anode with an active coating 256. For example, the cathode 254 may be an aluminum foil coated with a lithium compound (e.g., $LiCoO_2$, LiNCoMn, LiCoAl or $LiMn_2O_4$) and the anode 256 may be a copper foil coated with carbon or graphite. The separator 252 may include polyethylene (PE), polypropylene (PP), and/or a combination of PE and PP, such as PE/PP or PP/PE/PP. The separator 252 comprises a micro-porous membrane that also provides a "thermal shut down" mechanism. If the battery cell reaches the melting point of these materials, the pores shut down which prevents ion flow through the membrane.

The plurality of layers 250 may be wound to form a jelly roll structure or can be stacked to form a stacked-cell structure. The plurality of layers 250 are enclosed within enclosure 210 and immersed in an electrolyte 430, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The anode layers 256 of the plurality of layers 250 may be coupled to the enclosure 210 or may be coupled to a second feedthrough via a second tab (not shown) extending from the anode layers 256. The cathode layers 254 of the plurality of layers 250 may be coupled to a first tab 258, which may include intermediate tabs 440 extending from each cathode layer 254. The first tab 258 and the second tab extend from the plurality of layers 250 for electrical connection to other battery cells, the battery management unit 410, or other components as desired.

Figure 5:
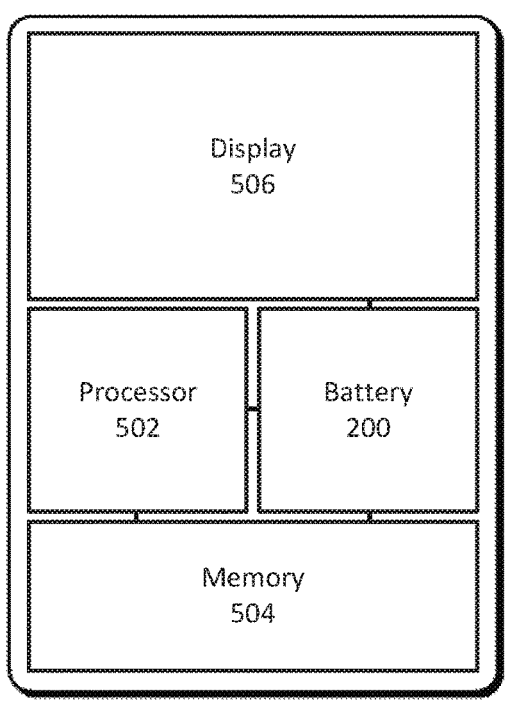
FIG. 5 illustrates a portable electronic device, in accordance with various aspects of the subject technology.

FIG. 5 illustrates a portable electronic device 500, in accordance with various aspects of the subject technology. The above-described rechargeable battery 200 can generally be used in any type of electronic device. For example, FIG. 5 illustrates a portable electronic device 500 which includes a processor 502, a memory 504 and a display 506, which are all powered by the battery 200. Portable electronic device 500 may correspond to a laptop computer, tablet computer, mobile phone, personal digital assistant (PDA), digital music player, watch, and wearable device, and/or other type of battery-powered electronic device. Battery 200 may correspond to a battery pack that includes one or more battery cells. Each battery cell may include a set of layers sealed in an enclosure, including a cathode with an active coating, a separator, an anode with an active coating, and utilize an electrical feedthrough that maximizes packaging efficiency and increases reliability by preventing accidental or inadvertent electrical shortage through implementation of a feedthrough 220 having an overmolded insulator 240, as described above.

Figure 6:
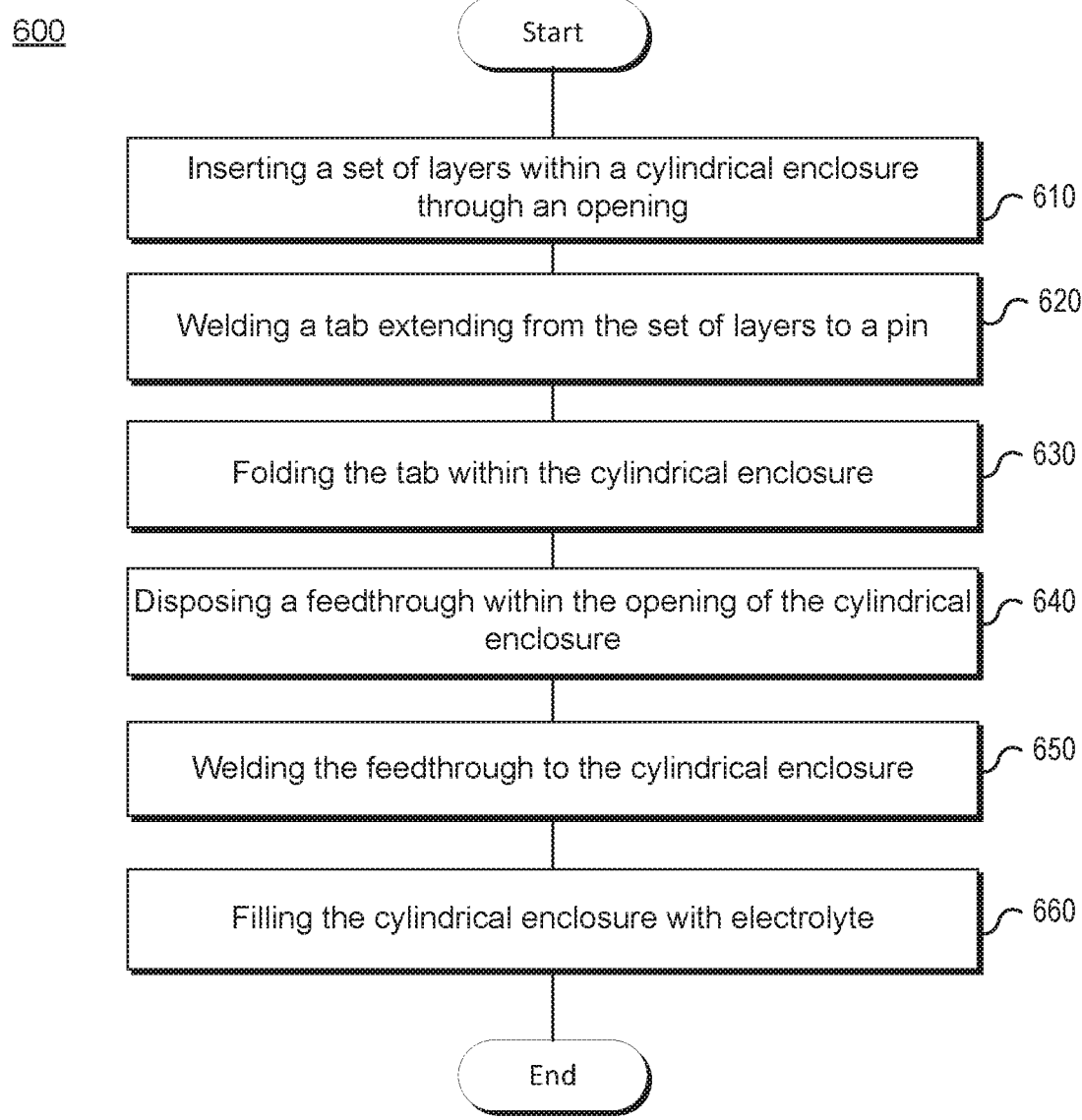
FIG. 6 illustrates an example method for manufacturing a battery cell, in accordance with various aspects of the subject technology.

FIG. 6 illustrates an example method 600 for manufacturing a battery cell, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 610, a set of layers are inserted within a cylindrical enclosure through an opening in the enclosure. The set of layers comprise a cathode layer, an anode layer, and a separator layer disposed between the cathode layer and the anode layer. At operation 620, a tab extending from the set of layers is welded to a pin of a feedthrough. The pin is electrically coupled to the set of layers to form an external battery terminal. At operation 630, the tab is folded within the cylindrical enclosure. At operation 640, a feedthrough is disposed within the opening of the cylindrical enclosure. As described above, the feedthrough comprises an annular channel having an outer sidewall, an inner sidewall, and a base. The feedthrough also comprises an insulator formed of glass, the insulator bonded to the inner sidewall of the annular channel and a portion of the base of the annular channel. The insulator further comprises an overmold portion that extends from the base of the annular channel to prevent electrical contact between the set of layers and the annular channel, as well as prevent electrical contact between the tab and the annular channel. The feedthrough also comprises the pin, where the pin extends through the insulator.

At operation 650, the feedthrough is welded to the cylindrical enclosure by welding the outer sidewall of the annular channel to the cylindrical enclosure along a periphery of the opening. At operation 660, the cylindrical enclosure is filled with electrolyte.

The method 600 may further include disposing a second feedthrough within a second opening of the cylindrical enclosure. The second feedthrough may include a second annular channel comprising an outer sidewall, an inner sidewall, and a base. The second feedthrough may also comprise a second insulator formed of glass, the second insulator bonded to the inner sidewall of the second annular channel and a portion of the base of the second annular channel. The second insulator also comprises an overmold portion that extends from the base of the second annular channel to prevent electrical contact between the set of layers and the second annular channel, as well as prevent electrical contact between a second tab extending from the set of layers and the second annular channel. The second feedthrough also comprises a second pin extending through the second insulator, the second pin electrically coupled to the set of layers to form a second external battery terminal. In one aspect, the second pin may be coupled to the second tab via a welding operation, as discussed above with respect to operation 620.

The method 600 may further include welding the outer sidewall of the second annular channel to the cylindrical enclosure along a periphery of the second opening to thereby create a hermetic seal at the second opening of the cylindrical enclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A battery cell, comprising:
 a wound set of layers comprising a cathode layer, an anode layer, and a separator layer disposed between the cathode layer and the anode layer;
 a cylindrical enclosure enclosing the set of layers, the enclosure comprising an opening for receiving a feedthrough, the feedthrough comprising:
  an annular channel comprising an outer sidewall, an inner sidewall, and a base;
  an insulator formed of glass, the insulator bonded to the inner sidewall of the annular channel and a portion of the base of the annular channel, the insulator further comprising an overmold portion that extends between the base of the annular channel and the set of layers, the overmold portion configured to prevent electrical contact between the set of layers and the annular channel; and
  a pin extending through the insulator, the pin electrically coupled to the set of layers to form an external battery terminal.

2. The battery cell of claim 1, wherein the outer sidewall of the annular channel is welded to the enclosure along a periphery of the opening.

3. The battery cell of claim 1, further comprising a tab extending from the set of layers, wherein the pin is welded to the tab proximal to the opening.

4. The battery cell of claim 3, wherein the tab comprises a fold proximal to the annular channel, and wherein the insulator prevents electrical contact between the fold of the tab and the annular channel.

5. The battery cell of claim 4, wherein the overmold portion of the insulator has a diameter that extends radially beyond the fold of the tab.

6. The battery cell of claim 1, wherein the cylindrical enclosure further comprises a second opening disposed opposite the first opening, the second opening configured to receive a second feedthrough, the second feedthrough comprising:
 a second annular channel comprising an outer sidewall, an inner sidewall, and a base;
 a second insulator formed of glass, the second insulator bonded to the inner sidewall of the second annular channel and a portion of the base of the second annular channel, the second insulator further comprising an overmold portion that extends between the base of the second annular channel and the set of layers, the overmold portion configured to prevent electrical contact between the set of layers and the second annular channel; and
 a second pin extending through the second insulator, the second pin electrically coupled to the set of layers to form a second external battery terminal.

7. The battery cell of claim 6, wherein the outer sidewall of the second annular channel is welded to the enclosure along a periphery of the second opening.

8. A battery feedthrough, comprising:
 an annular channel comprising an outer sidewall, an inner sidewall, and a base;
 an insulator formed of glass, the insulator bonded to the inner sidewall of the annular channel and a portion of the base of the annular channel, the insulator further comprising an overmold portion that extends from the base of the annular channel; and
 a pin extending through the insulator, the pin configured to form an external battery terminal.

9. The battery feedthrough of claim 8, wherein the outer sidewall of the annular channel is configured to be welded to a battery cell enclosure along a periphery of the enclosure.

10. The battery feedthrough of claim 8, wherein a material of the annular channel comprises stainless steel.

11. The battery feedthrough of claim 8, wherein a material of the pin comprises molybdenum.

12. A method for manufacturing a battery cell, the method comprising:
 inserting a set of layers within a cylindrical enclosure through an opening, the set of layers comprising a cathode layer, an anode layer, and a separator layer disposed between the cathode layer and the anode layer;
 welding a tab extending from the set of layers to a pin, the pin electrically coupled to the set of layers to form an external battery terminal;
 folding the tab within the cylindrical enclosure;
 disposing a feedthrough within the opening of the cylindrical enclosure, the feedthrough comprising:
  an annular channel comprising an outer sidewall, an inner sidewall, and a base;
  an insulator formed of glass, the insulator bonded to the inner sidewall of the annular channel and a portion of the base of the annular channel, the insulator further comprising an overmold portion that extends from the base of the annular channel, the overmold portion configured to prevent electrical contact between the set of layers and the annular channel; and
  the pin, the pin extending through the insulator.

13. The method of claim 12, further comprising welding the outer sidewall of the annular channel to the cylindrical enclosure along a periphery of the opening.

14. The method of claim 12, further comprising filling the cylindrical enclosure with electrolyte.

15. The method of claim 12, wherein the overmold portion of the insulator has a diameter that extends radially beyond the folded tab.

16. The method of claim 12, further comprising disposing a second feedthrough within a second opening of the cylindrical enclosure, the second feedthrough comprising:
- a second annular channel comprising an outer sidewall, an inner sidewall, and a base;
- a second insulator formed of glass, the second insulator bonded to the inner sidewall of the second annular channel and a portion of the base of the second annular channel, the second insulator further comprising an overmold portion that extends from the base of the second annular channel, the overmold portion configured to prevent electrical contact between the set of layers and the second annular channel; and
- a second pin extending through the second insulator, the second pin electrically coupled to the set of layers to form a second external battery terminal.

17. The method of claim 16, further comprising welding the outer sidewall of the second annular channel to the cylindrical enclosure along a periphery of the second opening.

18. The method of claim 12, wherein a material of the annular channel comprises stainless steel.

19. The method of claim 12, wherein a material of the cylindrical enclosure comprises stainless steel.

20. The method of claim 12, wherein a material of the pin comprises molybdenum.

\* \* \* \* \*